(12) United States Patent
Curtis et al.

(10) Patent No.: US 12,256,130 B2
(45) Date of Patent: Mar. 18, 2025

(54) CONTENT SCHEDULE DETECTION AND ADJUSTMENT

(71) Applicant: Comcast Cable Communications, LLC, Philadelphia, PA (US)

(72) Inventors: Brian Curtis, Washington, DC (US); Erik Schwartz, Kensington, MD (US); Stefan Deichmann, Alexandria, VA (US); Jan Neumann, Arlington, VA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

(21) Appl. No.: 17/534,644

(22) Filed: Nov. 24, 2021

(65) Prior Publication Data

US 2022/0337913 A1    Oct. 20, 2022

Related U.S. Application Data

(63) Continuation of application No. 15/259,598, filed on Sep. 8, 2016, now Pat. No. 11,218,775.

(51) Int. Cl.
| | |
|---|---|
| *H04N 21/482* | (2011.01) |
| *H04N 21/262* | (2011.01) |
| *H04N 21/433* | (2011.01) |
| *H04N 21/435* | (2011.01) |
| *H04N 21/458* | (2011.01) |
| *H04N 21/84* | (2011.01) |

(52) U.S. Cl.
CPC ....... *H04N 21/4821* (2013.01); *H04N 21/262* (2013.01); *H04N 21/26241* (2013.01); *H04N 21/4334* (2013.01); *H04N 21/435* (2013.01); *H04N 21/458* (2013.01); *H04N 21/84* (2013.01)

(58) Field of Classification Search
CPC ......... H04N 21/4334; H04N 21/47214; H04N 21/4147; H04N 21/2747
See application file for complete search history.

(56) References Cited

U.S. PATENT DOCUMENTS

| | | |
|---|---|---|
| 6,822,693 B2 | 11/2004 | Bates et al. |
| 8,385,723 B2 | 2/2013 | McClanahan et al. |
| 8,989,499 B2 | 3/2015 | Jojic et al. |
| 8,989,561 B1 | 3/2015 | Radloff |
| 11,218,775 B2 * | 1/2022 | Curtis ................. H04N 21/435 |
| 2002/0073424 A1 * | 6/2002 | Ward, III ............. H04N 21/458 348/E7.071 |
| 2002/0088010 A1 * | 7/2002 | Dudkiewicz ....... H04N 21/4755 725/38 |

(Continued)

*Primary Examiner* — Jason Salce
(74) *Attorney, Agent, or Firm* — Banner & Witcoff, Ltd.

(57) ABSTRACT

Various implementations described herein are directed to determining variations or changes to a predetermined programming schedule. In accordance with one method, a predicted end time of video content may be determined to be later than a scheduled end time of the video content. Also, it may be determined that video content scheduled to be displayed on a first stream or channel has been moved to a second stream or channel. A scheduled recording or transmission time of video content may be altered based on detected changes to the predetermined programming schedule. A program listing such as an electronic program guide may be revised based on detected changes to the predetermined programming schedule.

24 Claims, 16 Drawing Sheets

(56) References Cited

U.S. PATENT DOCUMENTS

| | | |
|---|---|---|
| 2002/0188945 A1 | 12/2002 | McGee et al. |
| 2003/0072559 A1 | 4/2003 | Van Haver |
| 2004/0078817 A1* | 4/2004 | Horowitz ............... H04N 5/782 348/E7.071 |
| 2004/0187151 A1* | 9/2004 | Dunstan ............. H04N 21/4334 348/E7.071 |
| 2005/0210501 A1* | 9/2005 | Zigmond ............... H04N 5/782 725/135 |
| 2008/0163306 A1 | 7/2008 | Sonoda |
| 2008/0263593 A1* | 10/2008 | Haque ................ H04N 21/6582 348/E7.071 |
| 2008/0307485 A1 | 12/2008 | Clement et al. |
| 2009/0077046 A1 | 3/2009 | Narahara et al. |
| 2010/0103774 A1 | 4/2010 | Haldorsen et al. |
| 2010/0220976 A1 | 9/2010 | Ellis et al. |
| 2010/0260473 A1* | 10/2010 | Newell ................ H04N 21/235 386/248 |
| 2012/0237182 A1 | 9/2012 | Eyer |
| 2015/0281778 A1* | 10/2015 | Xhafa .............. H04N 21/47217 386/292 |
| 2015/0375117 A1 | 12/2015 | Thompson et al. |
| 2016/0091318 A1 | 3/2016 | Silfven et al. |
| 2017/0178692 A1* | 6/2017 | Wouhaybi ............ H04N 21/858 |
| 2017/0332112 A1 | 11/2017 | Li et al. |

\* cited by examiner

810

| Stream | 8pm | 9pm |
|---|---|---|
| Sports 1 | Baseball – Rays vs. Rangers | Baseball – Rays vs. Rangers Extra Innings |
| Sports 2 | Sports Highlights 1977 | Sports Day with Jim |

| Stream | 8pm | 9pm |
|---|---|---|
| Sports 1 | Baseball<br>Rays vs. Rangers<br>Tied 2-2<br>Bottom 7$^{th}$, 2 out<br>A. Beltre Batting | Sports Day with Jim |
| Sports 2 | Football<br>Cowboys vs. Patriots<br>3$^{rd}$ quarter, 7:44<br>Cowboys 14 Patriots 10 | Football Postgame |

Figure 10

| Stream | 8pm | 9pm |
|---|---|---|
| Talk 1 | Government Talk<br>Current Topic: Income Tax | Roundtable |
| Sports 2 | Sports Highlights 1977 | Sports Highlights 1978 |

CONTENT SCHEDULE DETECTION AND ADJUSTMENT

CROSS-REFERENCE TO RELATED APPLICATIONS

This application is a continuation of U.S. application Ser. No. 15/259,598, filed on Sep. 8, 2016. The above-identified application is hereby incorporated by reference in its entirety.

BACKGROUND

Video content, such as television programming, may be delivered based on a predetermined schedule. In certain instances, the delivery of the video content may vary from the predetermined schedule. For example, if a football game goes into overtime, a transmission of the football game may extend beyond a set end time for the transmission. When delivery of a video content item varies from the predetermined schedule, the delivery time of other video content items may be rescheduled or canceled. For example, if two video content items are scheduled consecutively, and the first video content item is extended beyond a scheduled end time, then the start time of the second video content item may be delayed. These and other shortcomings are identified and addressed by this disclosure.

SUMMARY

The following summary is for illustrative purposes only, and is not intended to limit or constrain the detailed description. The following summary merely presents various described aspects in a simplified form as a prelude to the more detailed description provided below.

Variations from a predetermined programming schedule may be determined, or predicted, automatically based on information detected in a video content. For example, a game clock of a sports game may be detected and monitored to determine that the game is extending into overtime. In another example, a program may be recognized using content recognition and compared to a scheduled program. In another example, program timing may be recognized by comparing timing markers within content to a system or reference clock for content delivery. By monitoring video content, a system may determine that the video content has extended, or will extend, beyond a scheduled end time of the video content.

In certain instances, video content may be scheduled to be delivered on a first stream or channel, and then moved to a second stream or channel. For example, if first video content is extending beyond a scheduled end time, second video content that was originally scheduled after the first video content may be moved to an alternate stream or channel. A message indicating the change in schedule may be delivered in the first video content. The message may be detected and interpreted automatically using text or content recognition.

A scheduled recording time or stream may be modified based on detecting changes to or variations from a programming schedule. For example, if it is detected that a video content is being moved from a first stream, or channel, to a second stream, or channel, a scheduled recording of the video content may be modified so that the second stream, or channel, is recorded.

Using content recognition or video analysis, information about a video content may be detected and displayed on a program listing. For example, a score of a baseball game may be displayed on the program listing. In another example, an indication of whether a video content is currently playing a commercial may be displayed on the program listing. In yet another example, a topic of the video content may be displayed on the program listing.

The summary here is not an exhaustive listing of the novel features described herein, and are not limiting of the claims. These and other features are described in greater detail below.

BRIEF DESCRIPTION OF THE DRAWINGS

These and other features, aspects, and advantages of the present disclosure will become better understood with regard to the following description, claims, and drawings. The present disclosure is illustrated by way of example, and not limited by, the accompanying figures in which like numerals indicate similar elements.

FIG. 8B illustrates an adjusted program listing according to one or more illustrative aspects of the disclosure.

FIG. 10 illustrates a program listing with game information according to one or more illustrative aspects of the disclosure.

FIG. 15 illustrates a program listing with topic information according to one or more illustrative aspects of the disclosure.

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural or functional modifications may be made, without departing from the scope of the present disclosure.

Figure 1:
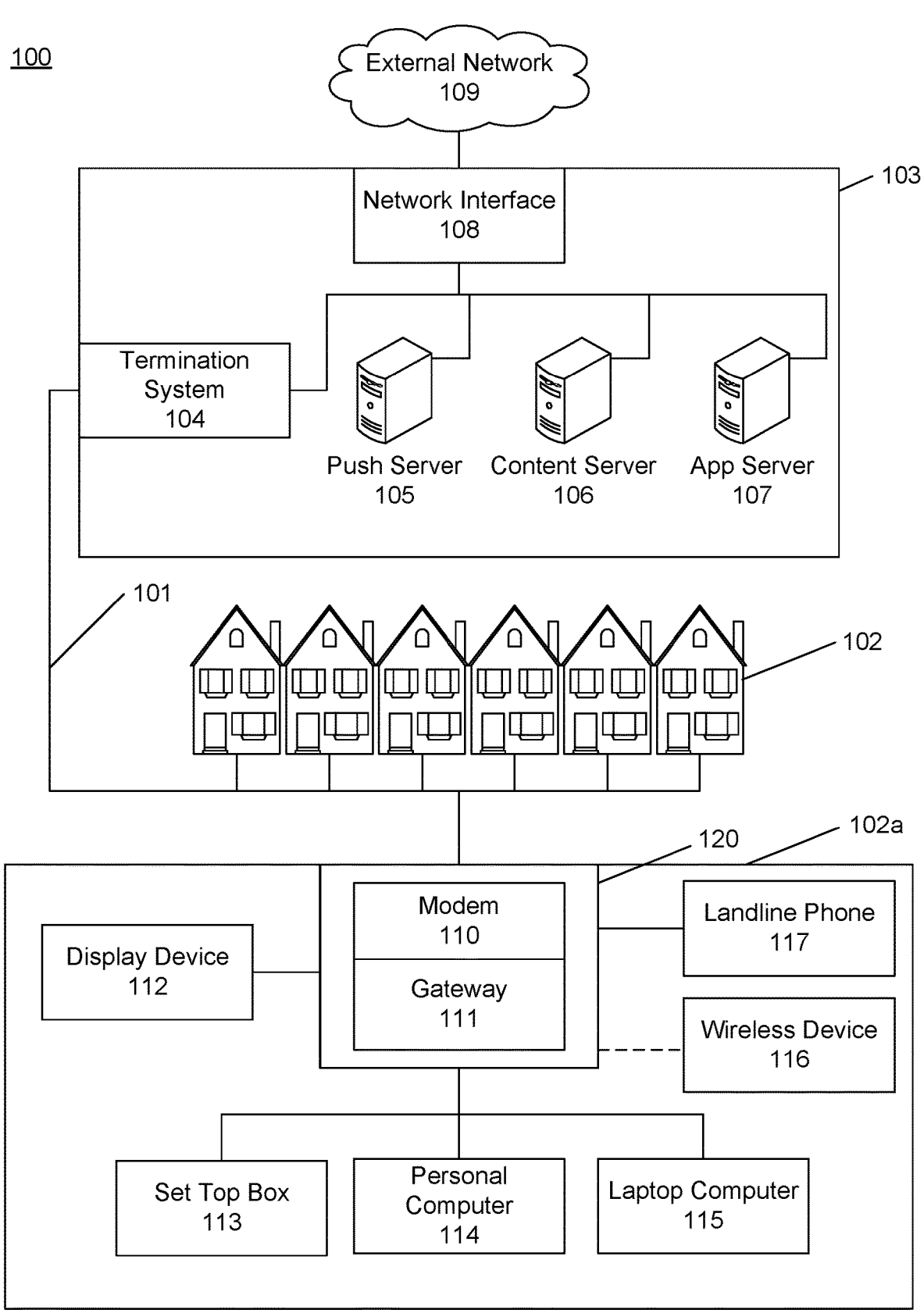
FIG. 1 illustrates an example communication network on which various features described herein may be used.

FIG. 1 illustrates an example communication network 100 on which many of the various features described herein may be implemented. Network 100 may be any type of information distribution network, such as satellite, telephone, cellular, wireless, etc. One example may be an optical fiber network, a coaxial cable network, or a hybrid fiber/coax distribution network. Such networks 100 use a series of interconnected communication links 101, such as coaxial cables, optical fibers, or wireless links to connect multiple premises 102, such as businesses, homes, or user dwellings to a local office 103 or headend. The local office 103 may transmit downstream information signals onto the links 101, and the premises 102 may have receivers used to receive and process those signals.

In one implementation, there may be one link 101 originating from the local office 103, and it may be split a number of times to distribute the signal to various premises 102 in the vicinity, which may be many miles, of the local office 103. The links 101 may include components such as splitters, filters, amplifiers, etc., to help convey the signal clearly, but in general each split introduces a bit of signal degradation. Portions of the links 101 may also be implemented with fiber-optic cable, while other portions may be implemented with coaxial cable, other lines, or wireless communication paths. In one example, fiber optic cable may be used along some portions, and signal degradation may be significantly minimized. In this example, a single local office 103 may, as a result of the fiber optic cable, be able to reach even farther with its network of links 101.

The local office 103 may include an interface 104, such as a termination system (TS). For example, the interface 104 may be a cable modem termination system (CMTS), which may be a computing device configured to manage communications between devices on the network of links 101 and backend devices such as servers 105-07. The interface 104 may be as specified in a standard, such as the Data Over Cable Service Interface Specification (DOCSIS) standard, published by Cable Television Laboratories, Inc. (a.k.a. CableLabs), or it may be a similar or modified interface instead. The interface 104 may be configured to place data on one or more downstream frequencies to be received by modems at the various premises 102, and to receive upstream communications from those modems on one or more upstream frequencies.

The local office 103 may also include one or more network interfaces 108, which can permit the local office 103 to communicate with various other external networks 109. These networks 109 may include, for example, networks of Internet devices, telephone networks, cellular telephone networks, fiber optic networks, local wireless networks, such as a WiMAX network, satellite networks, or any other desired network. The network interface 108 may include the corresponding circuitry needed to communicate on the external networks 109, and to other devices on the network such as a cellular telephone network and its corresponding cell phones.

As noted above, the local office 103 may include a variety of servers 105-07 that may be configured to perform various functions. For example, the local office 103 may include a push notification server 105. The push notification server 105 may generate push notifications to deliver data or commands to the various premises 102 in the network or to the devices in the premises 102 that are configured to detect such notifications. The local office 103 may also include a content server 106. The content server 106 may be one or more computing devices that are configured to provide content to users at their premises. This content may be, for example, video content such as video on demand movies or television programs, songs, text listings, or other types of content. The content server 106 may include software to validate user identities and entitlements, to locate and retrieve requested content, to encrypt the content, and to initiate delivery, in one example, by streaming, of the content to the requesting user or device.

The local office 103 may also include one or more application servers 107. An application server 107 may be a computing device configured to offer any desired service, and may run various languages and operating systems, such as servlets and JSP pages running on Tomcat/MySQL, OSX, BSD, Ubuntu, Redhat, HTML5, JavaScript, AJAX, or COMET. For example, an application server may be responsible for collecting television program listings information and generating a data download for electronic program guide listings. In some aspects of the disclosure, application server 107 may be responsible for monitoring user viewing habits and collecting that information for use in selecting advertisements. In other embodiments, application server 107 may be responsible for formatting and inserting advertisements in a video stream being transmitted to the premises 102. Although shown separately, one of ordinary skill in the art will appreciate that the push server 105, content server 106, and application server 107 may be combined. Further, here the push server 105, content server 106, and application server 107 are shown generally, and it will be understood that they may each contain memory storing computer executable instructions to cause a processor to perform steps described herein or memory for storing data.

An example premises 102a, such as a home, may include an interface 120. The interface 120 can include any communication circuitry needed to allow a device to communicate on one or more links 101 with other devices in the network. For example, the interface 120 may include a modem 110, which may include transmitters and receivers used to communicate on the links 101 and with the local office 103. The modem 110 may be, for example, a coaxial cable modem, for coaxial cable links 101, a fiber interface node, for fiber optic links 101, a twisted-pair telephone modem, a cellular telephone transceiver, a satellite transceiver, a local Wi-Fi router or access point, or any other desired modem device. Also, although only one modem is shown in FIG. 1, a plurality of modems operating in parallel may be implemented within the interface 120. Further, the interface 120 may include a gateway interface device 111. The modem 110 may be connected to, or be a part of, the gateway interface device 111. The gateway interface device 111 may be a computing device that communicates with the modem 110 to allow one or more other devices in the premises 102a, to communicate with the local office 103 and other devices beyond the local office 103. The gateway interface device 111 may be a set-top box 113 (STB), digital video recorder (DVR), computer server, or any other desired computing device. The gateway interface device 111 may also include local network interfaces to provide communication signals to requesting entities or devices in the premises 102a, such as display devices 112, for example, televisions, additional STBs 113 or DVRs, personal computers 114, laptop computers 115, wireless devices 116 such as wireless routers, wireless laptops, notebooks, tablets, netbooks, or smart phones, cordless phones, for example, Digital Enhanced Cordless Telephone—DECT phones, mobile phones, mobile televisions, personal digital assistants (PDA), landline phones 117, which may be Voice over Internet Protocol (VoIP) phones, and any other desired devices. Examples of the local network interfaces include Multimedia Over Coax Alliance (MoCA) interfaces, Ethernet interfaces, universal serial bus (USB) interfaces, wireless interfaces such as IEEE 802.11 or IEEE 802.15, analog twisted pair interfaces, Bluetooth interfaces, and others.

The gateway interface device 111 or a display device 112 may be used to view video content delivered from the content server 106. Additionally, the gateway interface device 111 or a display device 112 may be used to schedule recordings of the video content or to display a program listing indicating start and end times for video content. As described below in FIGS. 3, 5, 6, 7, 9, 11, 13, and 14, the video content may be monitored, and the program listing may be updated to indicate detected changes in scheduling or other detected information regarding the video content, or scheduled recordings may be adjusted based on the detected changes or information.

Figure 2:
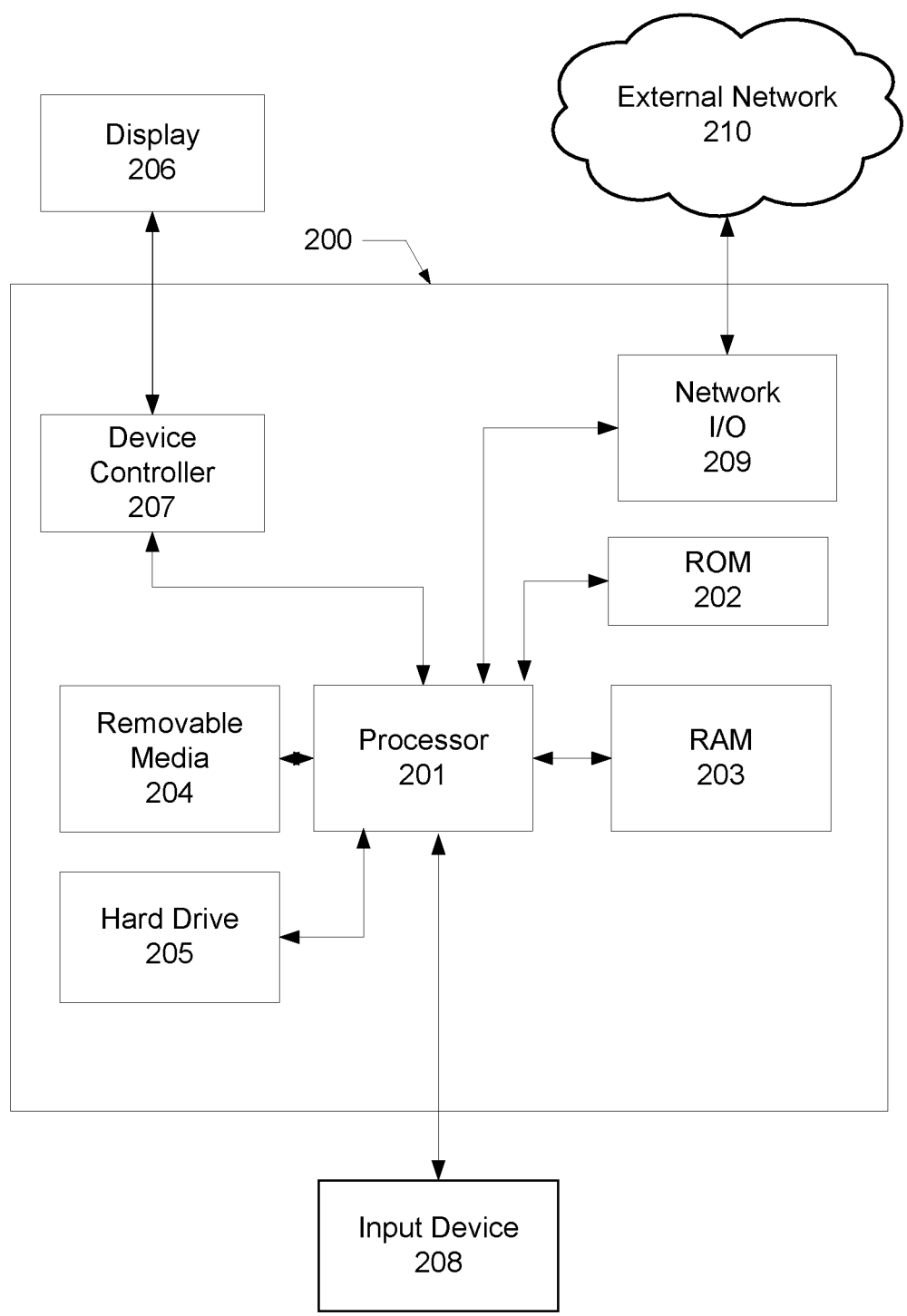
FIG. 2 illustrates an example computing device that may be used to implement any of the methods described herein.

FIG. 2 illustrates general hardware elements that can be used to implement any of the various computing devices discussed herein. The computing device 200 may include one or more processors 201, which may execute instructions of a computer program to perform any of the features described herein. The instructions may be stored in any type of computer-readable medium or memory, to configure the operation of the processor 201. For example, instructions may be stored in a read-only memory (ROM) 202, random access memory (RAM) 203, removable media 204, such as a Universal Serial Bus (USB) drive, compact disk (CD) or digital versatile disk (DVD), floppy disk drive, or any other desired storage medium. Instructions may also be stored in an attached, or internal, hard drive 205. The computing device 200 may include one or more output devices, such as a display 206, for example, an external television, and may include one or more output device controllers 207, such as a video processor. There may also be one or more user input devices 208, such as a remote control, keyboard, mouse, touch screen, microphone, etc. The computing device 200 may also include one or more network interfaces, such as a network input/output (I/O) circuit 209, for example, a network card, to communicate with an external network 210. The network I/O circuit 209 may be a wired interface, wireless interface, or a combination of the two. In some embodiments, the network I/O circuit 209 may include a modem, such as a cable modem, and the external network 210 may include the communication links 101 discussed above, the external network 109, an in-home network, a provider's wireless, coaxial, fiber, or hybrid fiber/coaxial distribution system, such as a DOCSIS network, or any other desired network.

FIG. 2 illustrates a hardware configuration of the device 200, but it should be understood that some or all of the illustrated components may be implemented as software. Modifications may be made to add, remove, combine, or divide components of the computing device 200 as desired. Additionally, the components illustrated may be implemented using basic computing devices and components, and the same components (e.g., processor 201, ROM storage 202, display 206, etc.) may be used to implement any of the other computing devices and components described herein. For example, the various components herein may be implemented using computing devices having components such as a processor executing computer-executable instructions stored on a computer-readable medium, as illustrated in FIG. 2. Some or all of the entities described herein may be software based, and may co-exist in a common physical platform. For example, a requesting entity can be a separate software process and program from a dependent entity, both of which may be executed as software on a common computing device.

One or more aspects of the disclosure may be embodied in a computer-usable data or computer-executable instructions, such as in one or more program modules, executed by one or more computers or other devices. Generally, program modules include routines, programs, objects, components, data structures, etc. that perform particular tasks or implement particular abstract data types when executed by a processor in a computer or other data processing device. The computer executable instructions may be stored on one or more computer readable media such as a hard disk, optical disk, removable storage media, solid state memory, RAM, etc. The functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects of the disclosure, and such data structures are contemplated within the scope of computer executable instructions and computer-usable data described herein.

Figure 3:
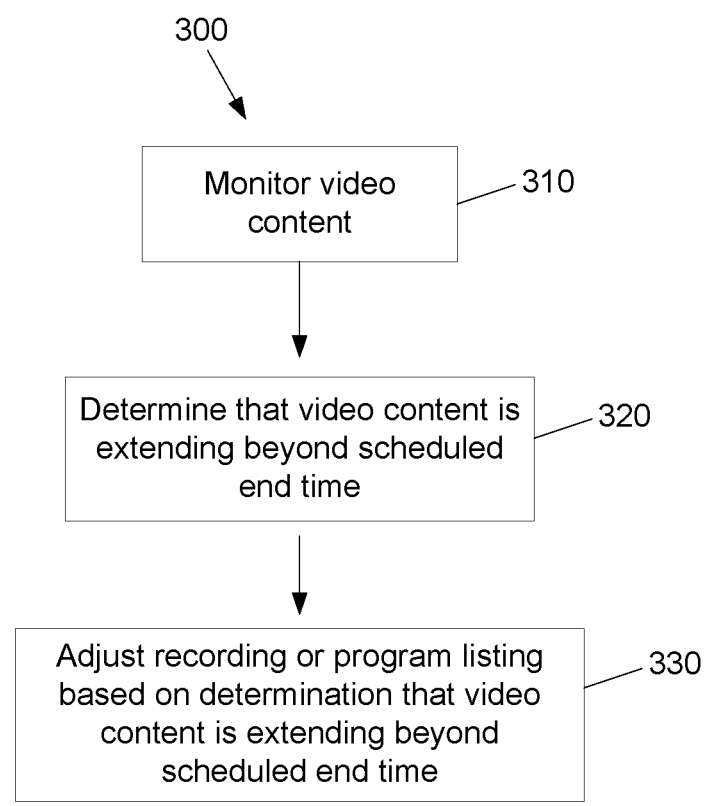
FIG. 3 is a flow diagram of a method for determining that a program is extending beyond a scheduled end time according to one or more illustrative aspects of the disclosure.

FIG. 3 is a flow diagram of a method 300 for determining that a program is extending beyond a scheduled end time according to one or more illustrative aspects of the disclosure. In one or more embodiments, the method 300 or one or more steps thereof may be performed by one or more computing devices or entities. For example, portions of the method 300 may be performed by components of the network 100 or the computing device 200. The method 300 or one or more steps thereof may be embodied in computer-executable instructions that are stored in a computer-readable medium, such as a non-transitory computer-readable medium. The steps in this flow diagram need not all be performed in the order specified and some steps may be omitted or changed in order.

At step 310, video content, such as a content stream, linear stream, or a channel, may be monitored. For example, the video content may be monitored using a content recognition system, computer vision technology, closed caption extraction, automatic content recognition technology, program boundary detection techniques, or combinations thereof. The video, audio, or captioning associated with the video content may be monitored. The video content may be monitored to determine transitions in the video content. For example, the video content may be monitored to determine that the content is transitioning from a program portion of the video content to a credits portion of the video content. In another example, the video content may be monitored to determine that the content is transitioning from a program portion of the video content to a commercial portion of the video content. In yet another example, the video content may be monitored for information embedded into the broadcast signal, such as in-band markers embedded by programmers into a broadcast stream.

In one implementation, a portion of the video content may be compared to stored video content to identify the portion of the video content. For example, a portion of the video content may be used determine a time associated with the portion of the video content and a title of the video content.

Monitoring video content at step 310 may comprise recognizing text displayed in the video content. For example, a game clock, scoreboard, or other text displayed during a sporting event may be identified and monitored.

At step 320, a determination may be made, based on the monitoring performed at step 310, that the video content is extending beyond a scheduled end time for the video content. For example, the monitoring at step 310 may indicate that the video content has not ended at the scheduled end time. In one implementation, an end time of the video content may be predicted based on a visual indicator in the video content. For example, based on a game clock being monitored at step 310, a prediction may be made that the video content will extend beyond a scheduled end time. In another example, the determination may be made based on a textual indicator that is overlaid on the video content.

At step 330, a recording or program listing may be adjusted based on the determination made at step 320. The program listing may be referred to as a content listing. The program listing may comprise an electronic program guide. Adjusting the recording may comprise adjusting a recording schedule or adjusting a stream to record. For example, if a video content is scheduled to be recorded, it may be determined at step 320 that the video content has been moved from a scheduled channel to an alternate channel, and the recording may be performed on the alternate channel.

The program listing, for example, an electronic program guide, may comprise a linear schedule that indicates a scheduled start time and a scheduled end time of one or more video content items. The program listing may be modified based on any changes in scheduling detected at steps 310 and 320. For example, if a football game is predicted to extend beyond a scheduled end time, the program listing may be modified to indicate that the football game will extend beyond the scheduled end time. In one implementation, the program listing may be modified by modifying metadata corresponding to the video content to indicate that scheduling for the video content has been modified. The metadata may comprise a scheduled start time and a scheduled end time of a video content. The metadata may be linear schedule metadata used to generate the program listing. In one implementation, the program listing, or the metadata, may comprise an Extensible Markup Language (XML) based program listing that is retrieved or generated by a device, such as the set top box 113 or wireless device 116. For example, the program listing may be retrieved when a user selects a 'guide' on a remote control.

Figure 4:
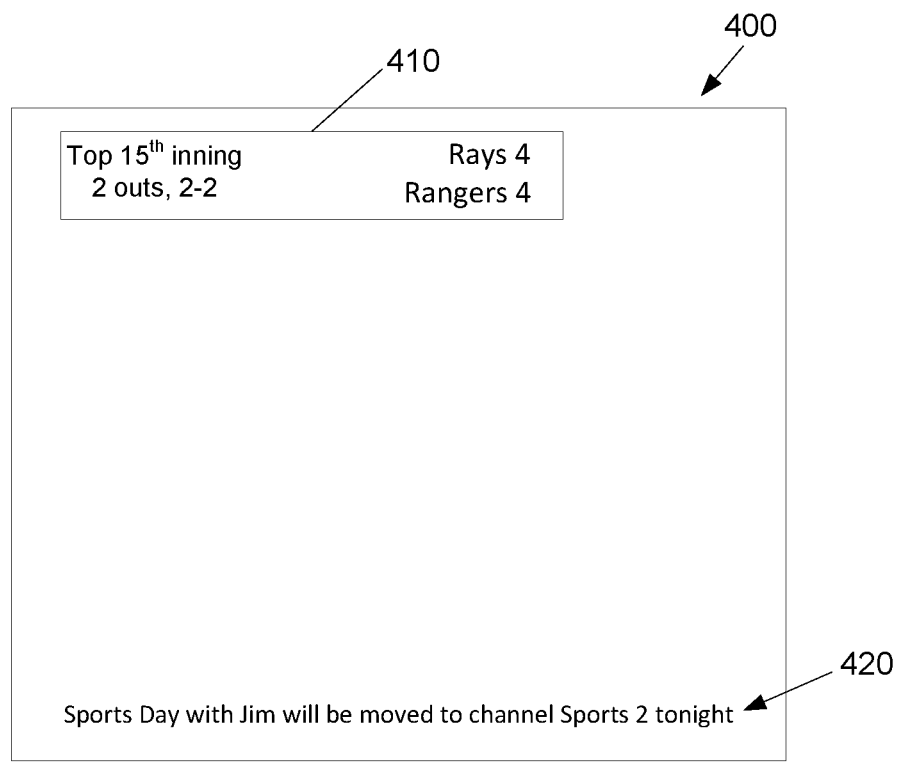
FIG. 4 illustrates a video content according to one or more illustrative aspects of the disclosure.

FIG. 4 illustrates a video content 400 according to one or more illustrative aspects of the disclosure. Portions of the video content 400 may be identified and used to adjust a program listing or a recording schedule. Scoreboard 410 indicates an inning, a number of outs, balls and strikes, and a score of a baseball game. The information in the scoreboard 410 may be scanned by a content recognition system and used to adjust a recording as described below in FIG. 5 or to adjust a program listing as described below in FIG. 6.

Figure 7:
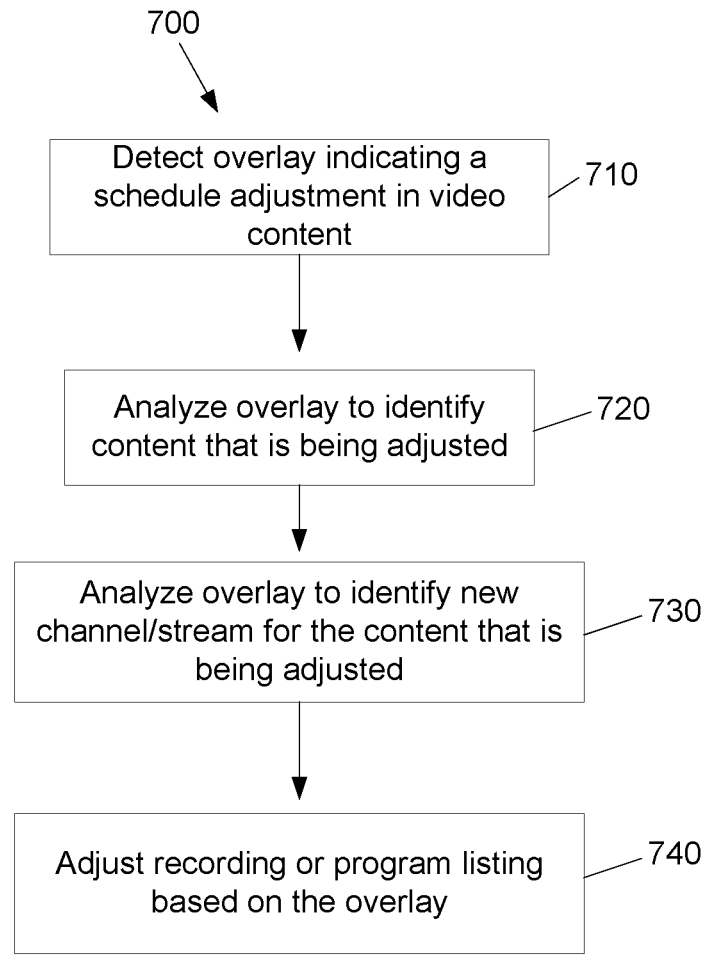
FIG. 7 is a flow diagram of a method for detecting a schedule adjustment overlay according to one or more illustrative aspects of the disclosure.

Overlay 420 indicates a schedule adjustment. The overlay 420 may indicate instructions for viewing, or accessing, a video content scheduled after the video content 400. For example, if the video content 400 is extending beyond a scheduled end time, a video content scheduled to display after the video content 400 may be moved to an alternative channel or stream. The text in the overlay 420 may be scanned and recognized by a character recognition, or text recognition, system. FIG. 7, described below, is a method for making adjustments to a recording schedule or a program listing based on an overlay such as overlay 420.

Although video content 400 illustrates a baseball game, it should be understood that the methods described herein may be applied to various different types of video content. For example, a scoreboard may be recognized during a football match. In another example, an awards show may be monitored to determine that the awards show is extending beyond a scheduled end time. In yet another example, a video content may be monitored to determine that the video content has been interrupted by a weather alert or a presidential announcement.

Figure 5:
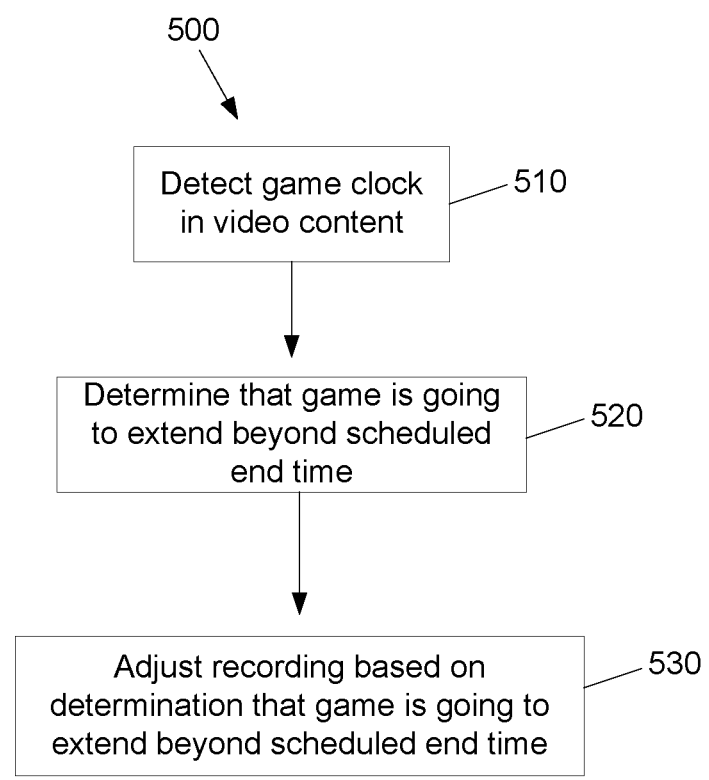
FIG. 5 is a flow diagram of a method for adjusting a recording according to one or more illustrative aspects of the disclosure.

FIG. 5 is a flow diagram of a method for adjusting a recording according to one or more illustrative aspects of the disclosure. In one or more embodiments, the method 500 or one or more steps thereof may be performed by one or more computing devices or entities. For example, portions of the method 500 may be performed by components of the network 100 or the computing device 200. The method 500 or one or more steps thereof may be embodied in computer-executable instructions that are stored in a computer-readable medium, such as a non-transitory computer-readable medium. The steps in this flow diagram need not all be performed in the order specified and some steps may be omitted or changed in order.

At step 510 a game clock, other type of scoreboard, or any other timing marker, may be detected in a video content. The video content may comprise a sports video content, such as a baseball, hockey, or football game. For example, the scoreboard 410 may be detected. Although step 510 describes detecting a game clock, other information that may be useful in predicting an end time of a sporting event may be detected. For example, in an automobile race, a number of laps may be detected. In another example, during a cycling race, a distance remaining may be detected.

At step 520 a determination, or prediction, may be made that the video content, or the game within the video content, will extend beyond a scheduled end time of the video content. For example, a determination may be made that a football game is in overtime and is going to extend beyond a scheduled end time. In another example, a prediction that the video content will extend beyond a scheduled end time may be made based on determining that a scoreboard indicates that ten minutes remain in a match, but the predetermined end time of the match is in five minutes. In one implementation a predicted end time of the video content may be determined by comparing the time on the clock detected at step 510 to an expected time on the clock. For example, the expected time on the clock may be calculated based on a start time of the video content and an amount of time that has elapsed since the start time. In one implementation, timing markers within the video content may be compared to a system clock or reference clock, such as a system clock or reference clock for content delivery.

At step 530 a scheduled recording may be adjusted based on the determination that the game is going to extend beyond the scheduled end time. For example, if the video content monitored at step 510 is scheduled for recording, the end time of the recording may be extended based on the prediction that the video content is going to extend beyond the scheduled end time. In another example, if a user selects to record a second video content that is scheduled for after the video content that is going to extend beyond the scheduled end time, the scheduled beginning and ending time for the recording of the second video content may be adjusted based on the determination made at step 520.

Figure 6:
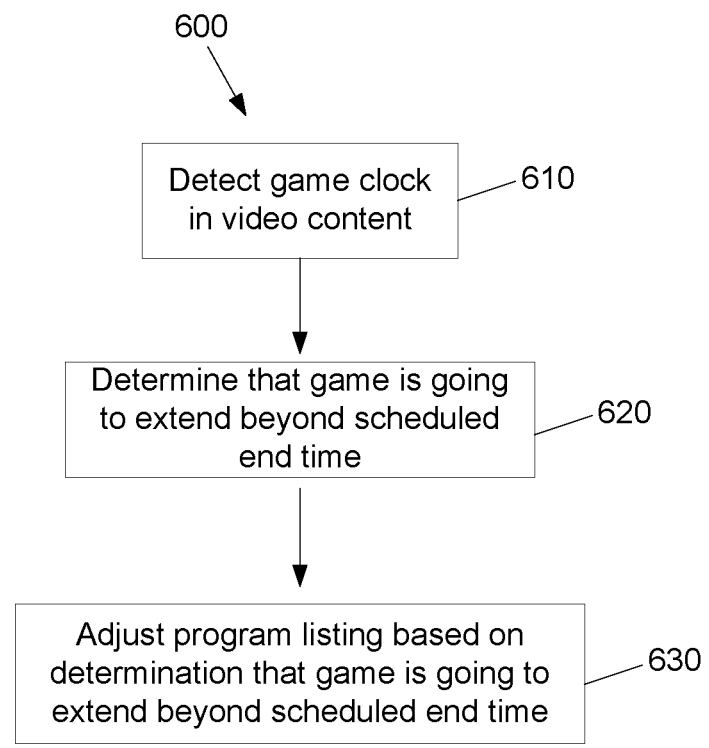
FIG. 6 is a flow diagram of a method for adjusting a program listing according to one or more illustrative aspects of the disclosure.

FIG. 6 is a flow diagram of a method 600 for adjusting a program listing according to one or more illustrative aspects of the disclosure. In one or more embodiments, the method 600 or one or more steps thereof may be performed by one or more computing devices or entities. For example, portions of the method 600 may be performed by components of the network 100 or the computing device 200. The method 600 or one or more steps thereof may be embodied in computer-executable instructions that are stored in a computer-readable medium, such as a non-transitory computer-readable medium. The steps in this flow diagram need not all be performed in the order specified and some steps may be omitted or changed in order.

At step 610, a game clock may be detected in a video content. At step 620, a determination may be made that the video content is going to extend beyond a scheduled end time. Actions performed at steps 610 and 620 may be similar to actions performed at steps 510 and 520, described above.

Figure 8A:
FIG. 8A illustrates a program listing according to one or more illustrative aspects of the disclosure.

At step 630, a program listing may be adjusted based on the determination that the video content is going to extend beyond a scheduled end time. For example, metadata associated with the video content may be modified to indicate a later end time. In another example, an alert may be transmitted to a device, such as a set top box 113, indicating that the video content is going to extend beyond the scheduled end time. One or more listings in the program listing may be adjusted at step 630. For example, if it is known that a first video content listed in the program listing is extending beyond a scheduled end time, the scheduled start times and end times for a predetermined number of programs scheduled after the first video content may be adjusted. FIGS. 8A and 8B, described below, illustrate examples of an adjusted program listing.

FIG. 7 is a flow diagram of a method 700 for detecting a schedule adjustment overlay according to one or more illustrative aspects of the disclosure. In one or more embodiments, the method 700 or one or more steps thereof may be performed by one or more computing devices or entities. For example, portions of the method 700 may be performed by components of the network 100 or the computing device 200. The method 700 or one or more steps thereof may be embodied in computer-executable instructions that are stored in a computer-readable medium, such as a non-transitory computer-readable medium. The steps in this flow diagram need not all be performed in the order specified and some steps may be omitted or changed in order.

At step 710 an overlay indicating a schedule adjustment may be detected in a video content. Overlay 420, described above in FIG. 4, illustrates an example of an overlay that may be detected at step 710. The overlay may indicate a change in time, a change in channel or stream, a cancellation of a program, an interruption to a program, or other information. The overlay may be detected using computer vision technology, character recognition technology, or other methods of detecting an overlay in video content.

At step 720 the overlay may be analyzed to identify the content that is being adjusted. For example, if the overlay says "The Good Wife is being moved to channel 3," then at step 720 the name of the content, 'The Good Wife,' may be identified. As describe above at step 710, computer vision technology, character recognition technology, or other methods may be used to identify the content that is being adjusted. In one implementation, the text in the overlay may be identified and compared to the title of a content scheduled to follow the video content in which the overlay appears.

At step 730 the overlay may be analyzed to detect a new channel, stream, time, or other adjustment indicated in the overlay. For example, if the overlay says "The Simpsons is being broadcast at 10 p m instead of 9 p m," the content title, i.e., 'The Simpsons', may be detected at step 720 and the new time, i.e., '10 p m,' may be detected at step 730. In another example, if the overlay says "The Tonight Show is being moved to MSNBC," the new channel, i.e., 'MSNBC,' may be detected at step 730.

At step 740 a recording schedule or program listing may be adjusted based on the overlay. For example, if 'Sports Day with Jim' is scheduled to record from a stream 'Sports 1', and the overlay 420 is detected, the recording schedule may be modified to record 'Sports Day with Jim' from a stream 'Sports 2.' In another example, illustrated in FIGS. 8A and 8B, if overlay 420 is detected, a program listing may be adjusted to indicate that 'Sports Day with Jim' will be delivered on 'Sports 2.'

FIG. 8A illustrates a program listing 800 according to one or more illustrative aspects of the disclosure. In the program listing 800, a baseball game is scheduled on 'Sports 1' from 8 p m to 9 p m, and 'Sports Day with Jim' is scheduled on 'Sports 1' from 9 p m to 10 p m.

FIG. 8B illustrates an adjusted program listing 810 according to one or more illustrative aspects of the disclosure. The adjusted program listing 810 may be a modified version of the program listing 800. For example, when the overlay 420 is detected, program listing 800 may be modified to create the adjusted program listing 810. In the adjusted program listing 810 the baseball game has been extended from ending at 9 p m to ending at 10 p m. 'Sports Day with Jim,' which was scheduled to begin at 9 p m on 'Sports 1' has been moved to 'Sports 2.' Methods 300, 600, or 700 may be used to adjust the program listing 800 to form the adjusted program listing 810. For example, the program listing 800 may be modified to the adjusted program listing 810 in response to detecting an overlay during 'Baseball—Rays vs. Rangers' or detecting or predicting that 'Baseball—Rays vs. Rangers' is going to extend, or is extending, beyond the originally scheduled end time of 9 p m.

Figure 9:
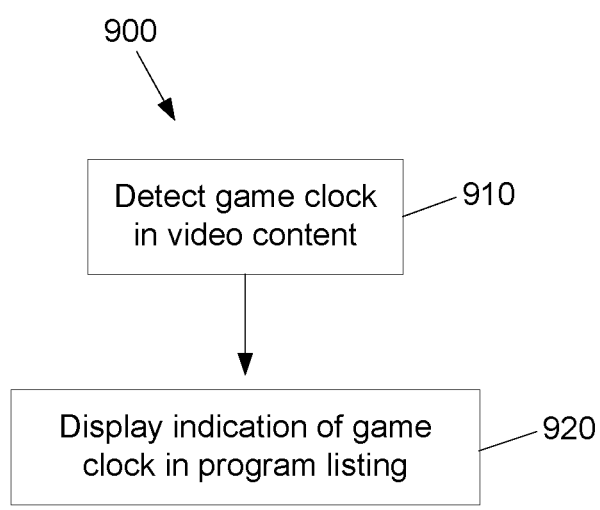
FIG. 9 is a flow diagram of a method for displaying a game clock in a program listing according to one or more illustrative aspects of the disclosure.

FIG. 9 is a flow diagram of a method 900 for displaying a game clock in a program listing according to one or more illustrative aspects of the disclosure. In one or more embodiments, the method 900 or one or more steps thereof may be performed by one or more computing devices or entities. For example, portions of the method 900 may be performed by components of the network 100 or the computing device 200. The method 900 or one or more steps thereof may be embodied in computer-executable instructions that are stored in a computer-readable medium, such as a non-transitory computer-readable medium. The steps in this flow diagram need not all be performed in the order specified and some steps may be omitted or changed in order.

At step 910, a game clock, scoreboard, or other indicator of the status of an event may be detected in a video content. Actions performed at step 910 may be similar to those described above at step 510. At step 920, an indication of the game clock or other information detect at step 910 may be displayed in a program listing. In one implementation, an indicator of the information detected at step 910 may be added to metadata corresponding to the video content. FIG. 10 illustrates an example of a program listing that may be generated using method 900. By presenting an indicator of the status of a sporting event in a program guide, a user can determine the status of the sporting event without viewing the video content comprising the sporting event.

FIG. 10 illustrates a program listing 1000 with game information according to one or more illustrative aspects of the disclosure. In FIG. 10, the program listing 1000 indicates a title of a sporting event, along with information indicating a current status of the sporting event. In the baseball game listing illustrated in the listing 1000, a score, inning, number of outs, and current batter are indicated in the listing. In the football game listing illustrated in the listing 1000 a quarter, time, and score are indicated in the listing. Other sports or status indicators may be included in a program listing 1000. For example, for a race, an indication of who is in first place may be displayed in the program listing 1000. In one implementation, during an awards show, an identify of a winner of an award may be determined automatically and displayed in the program listing 1000.

Figure 11:
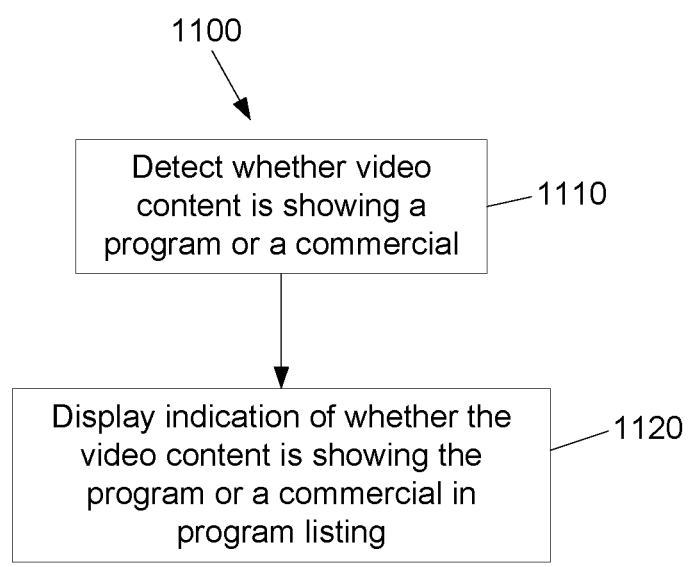
FIG. 11 is a flow diagram of a method for displaying an indication of whether a commercial is playing in a program listing according to one or more illustrative aspects of the disclosure.

FIG. 11 is a flow diagram of a method 1100 for displaying an indication of whether a commercial is playing in a program listing according to one or more illustrative aspects of the disclosure. In one or more embodiments, the method 1100 or one or more steps thereof may be performed by one or more computing devices or entities. For example, portions of the method 1100 may be performed by components of the network 100 or the computing device 200. The method 1100 or one or more steps thereof may be embodied in computer-executable instructions that are stored in a computer-readable medium, such as a non-transitory computer-readable medium. The steps in this flow diagram need not all be performed in the order specified and some steps may be omitted or changed in order.

At step 1110 a video content may be analyzed to determine whether a program or a commercial is playing. For example, program boundary detection techniques may be used to determine that a period of commercials is beginning or ending. In another example, automatic content recognition technology may be used to determine that a commercial is playing.

Figure 12:
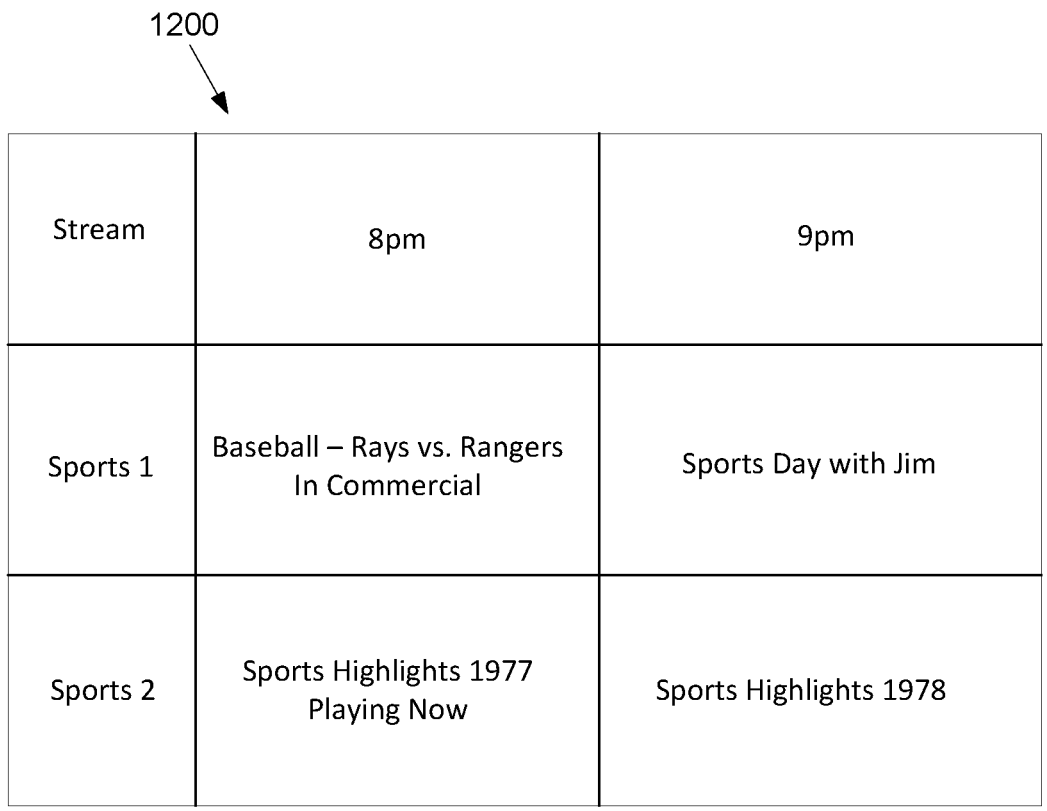
FIG. 12 illustrates a program listing with commercial information according to one or more illustrative aspects of the disclosure.

At step 1120, an indication of whether a video content is showing a commercial may be displayed in a program listing. FIG. 12 illustrates one example of a program listing that indicates whether a video content is playing a program or a commercial. The program listing may indicate whether or not a commercial is playing with an icon, by changing a color, by using a textual indicator, or by other methods. In one implementation, when a video content is detected to enter or exit a period of commercials, metadata corresponding to the video content may be modified to indicate that the video content is in or out of a period of commercials.

FIG. 12 illustrates a program listing 1200 with commercial information according to one or more illustrative aspects of the disclosure. In the program listing 1200, the listing for 'Baseball—Rays vs. Rangers' at 8pm indicates that this video content is in a commercial, and the listing for 'Sports Highlights 1977' at 8pm indicates that this video content is not in a commercial.

Figure 13:
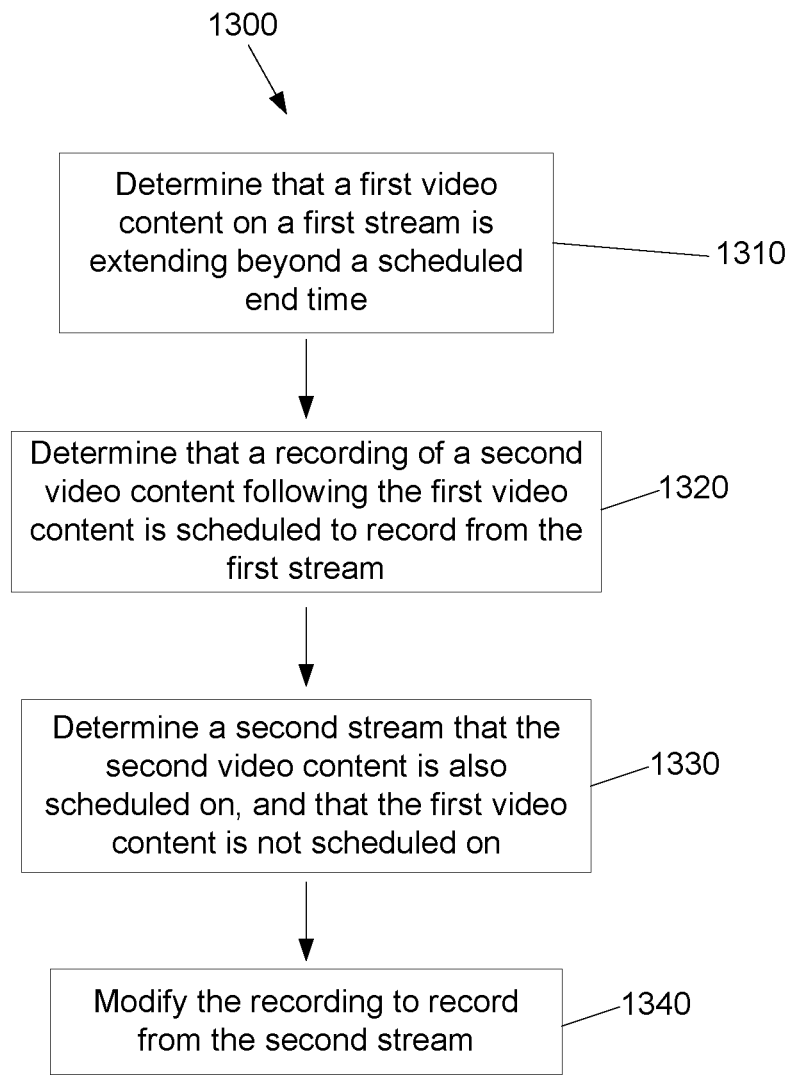
FIG. 13 is a flow diagram of a method for modifying a scheduled recording to an alternate stream according to one or more illustrative aspects of the disclosure.

FIG. 13 is a flow diagram of a method 1300 for modifying a scheduled recording to an alternate stream according to one or more illustrative aspects of the disclosure. In one or more embodiments, the method 1300 or one or more steps thereof may be performed by one or more computing devices or entities. For example, portions of the method 1300 may be performed by components of the network 100 or the computing device 200. The method 1300 or one or more steps thereof may be embodied in computer-executable instructions that are stored in a computer-readable medium, such as a non-transitory computer-readable medium. The steps in this flow diagram need not all be performed in the order specified and some steps may be omitted or changed in order.

At step 1310 the method may determine that a first video content on a first stream is extending beyond a scheduled end time. Actions performed at step 1310 may be similar to those performed at step 320, described above.

At step 1320 the method may determine that a recording of a second video content that is scheduled to follow the first video content is scheduled to record from the first stream. For example, in regards to FIG. 8A, the method may determine at steps 1310 and 1320 that 'Baseball—Rays vs Rangers' is going to extend beyond the scheduled end time of 9 p m, and that 'Sports Day with Jim' is scheduled to be recorded at 9 p m from stream 'Sports 1.'

At step 1330, a second stream may be identified, where the second video content is scheduled to be delivered from but that the first video content is not. For example, in regards to FIG. 8A, if a user selects to record 'Sports Day with Jim,' an alternative stream that is scheduled to display 'Sports Day with Jim' may be identified, where the alternative stream is not scheduled to display 'Baseball—Rays vs. Rangers.'

At step 1340, the scheduled recording of the second video content may be modified to record from the second stream instead of the first stream. In the first stream, delivery of the second video content may vary from a scheduled delivery time because the first video content is extending beyond a scheduled end time. But, because the second stream is not delivering the first video content, the second video content may be delivered at the scheduled delivery time in the second stream. Thus, by moving a recording from the first stream to the second stream, the second video content may be recorded at the scheduled time.

Figure 14:
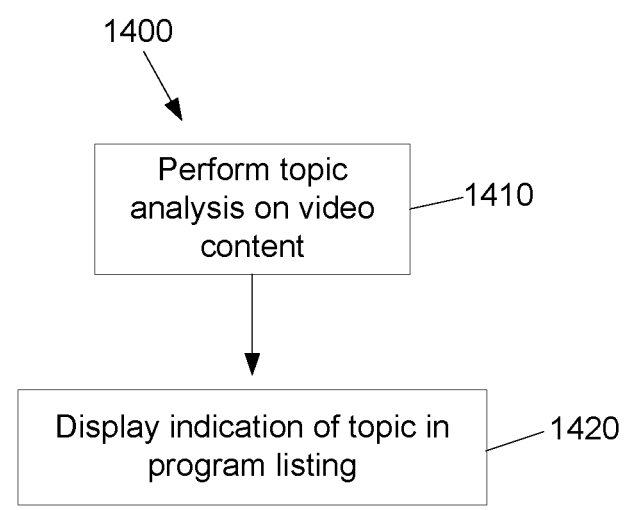
FIG. 14 is a flow diagram of a method for performing topic analysis on video content according to one or more illustrative aspects of the disclosure.

FIG. 14 is a flow diagram of a method 1400 for performing topic analysis on video content according to one or more illustrative aspects of the disclosure. In one or more embodiments, the method 1400 or one or more steps thereof may be performed by one or more computing devices or entities. For example, portions of the method 1400 may be performed by components of the network 100 or the computing device 200. The method 1400 or one or more steps thereof may be embodied in computer-executable instructions that are stored in a computer-readable medium, such as a non-transitory computer-readable medium. The steps in this flow diagram need not all be performed in the order specified and some steps may be omitted or changed in order.

At step 1410 topic analysis may be performed on a video content. The topic analysis may be performed using text recognition, computer vision technology, closed caption extraction, or other techniques. For example, text retrieved using closed caption extraction may be compared to a list of known words related to a topic to determine whether the topic is being discussed on the video content. In one implementation, the topic analysis may be performed continuously throughout the presentation of a video content.

At step 1420, an indication of the topic determined at step 1410 may be displayed on a program listing. In one implementation, metadata corresponding to the video content may be modified each time a change in topic is determined by the topic analysis performed at step 1410. FIG. 15 illustrates a program listing 1500 with topic information according to one or more illustrative aspects of the disclosure. The program listing 1500 may be generated using method 1400. In the listing 1500, the program 'Government Talk' on stream 'Talk 1' has been analyzed to determine a topic, and an indicator that the topic is 'Income Tax' is displayed on the program listing 1500.

Although example embodiments are described above, the various features and steps may be combined, divided, omitted, rearranged, revised or augmented in any desired manner, depending on the specific outcome or application. Various alterations, modifications, and improvements will readily occur to those skilled in art. Such alterations, modifications, and improvements as are made obvious by this disclosure are intended to be part of this description, though not expressly stated herein, and are intended to be within the spirit and scope of the disclosure. Accordingly, the foregoing description is by way of example only, and not limiting. This patent is limited only as defined in the following claims and equivalents thereto.

The invention claimed is:

1. A system comprising:
a server; and
one or more computing devices,
wherein the server is configured to:
  determine, based on a comparison of text from one or more closed captions corresponding to a first video content item to one or more keywords, a predicted end time of the first video content item;
  determine that the predicted end time of the first video content item is later than a scheduled end time of the first video content item; and
  change, based on the predicted end time of the first video content item and prior to the scheduled end time of the first video content item, an indication of a video stream from which a second video content item is scheduled to be recorded, wherein the second video content item is scheduled after the first video content item; and
wherein the one or more computing devices are configured to receive the changed indication of the video stream from which the second video content item is scheduled to be recorded.

2. The system of claim 1, wherein the server is configured to transmit, to the one or more computing devices and based on the predicted end time of the first video content item, an instruction to modify a start time and an end time of a recording of the second video content item.

3. The system of claim 2, wherein the instruction comprises an instruction to modify the start time and the end time of the recording by modifying the start time of the recording to be the predicted end time of the first video content item.

4. The system of claim 1, wherein the server is configured to extract, from the first video content item, the one or more closed captions.

5. The system of claim 1, wherein the server is configured to:
  retrieve the scheduled end time of the first video content item from metadata corresponding to the first video content item; and
  compare the predicted end time of the first video content item to the scheduled end time of the first video content item.

6. The system of claim 1, wherein the server is configured to:
  modify, based on the predicted end time of the first video content item, a first entry in a content listing; and
  modify, based on the predicted end time of the first video content item, a second entry in the content listing, wherein modifying the second entry in the content listing comprises changing the indication of the video stream from which the second video content item is scheduled to be recorded.

7. The system of claim 1, wherein the server is configured to determine the predicted end time of the first video content item using at least one of computer vision technology or automatic content recognition technology.

8. The system of claim 1, wherein the changed indication of the video stream from which the second video content item is scheduled to be recorded comprises a different channel than a channel providing the first video content item.

9. A non-transitory computer-readable medium storing instructions that, when executed, cause a computing device to:
  determine, based on a comparison of text from one or more closed captions corresponding to a first video content item to one or more keywords, a predicted end time of the first video content item;
  determine that the predicted end time of the first video content item is later than a scheduled end time of the first video content item; and
  change, based on the predicted end time of the first video content item and prior to the scheduled end time of the first video content item, an indication of a video stream from which a second video content item is scheduled to be recorded, wherein the second video content item is scheduled after the first video content item.

10. The non-transitory computer-readable medium of claim 9, wherein the instructions, when executed, cause the computing device to transmit, based on the predicted end time of the first video content item, an instruction to modify a start time and an end time of a recording of the second video content item.

11. The non-transitory computer-readable medium of claim 10, wherein the instruction comprises an instruction to modify the start time of the recording to be the predicted end time of the first video content item.

12. The non-transitory computer-readable medium of claim 9, wherein the instructions, when executed, cause the computing device to extract, from the first video content item, the one or more closed captions.

13. The non-transitory computer-readable medium of claim 9, wherein the instructions, when executed, cause the computing device to:
  retrieve the scheduled end time of the first video content item from metadata corresponding to the first video content item; and
  compare the predicted end time of the first video content item to the scheduled end time of the first video content item.

14. The non-transitory computer-readable medium of claim 9, wherein the instructions, when executed, cause the computing device to:
  modify, based on the predicted end time of the first video content item, a first entry in a content listing; and
  modify, based on the predicted end time of the first video content item, a second entry in the content listing, wherein modifying the second entry in the content listing comprises changing the indication of the video stream from which the second video content item is scheduled to be recorded.

15. The non-transitory computer-readable medium of claim 9,
wherein the instructions, when executed, cause the computing device to determine the predicted end time of the first video content item using at least one of computer vision technology or automatic content recognition technology.

16. The non-transitory computer-readable medium of claim 9, wherein the changed indication of the video stream from which the second video content item is scheduled to be recorded comprises a different channel than a channel providing the first video content item.

17. A server comprising:
one or more processors; and memory storing instructions that, when executed by the one or more processors, cause the server to:
- determine, based on a comparison of text from one or more closed captions corresponding to a first video content item to one or more keywords, a predicted end time of the first video content item;
- determine that the predicted end time of the first video content item is later than a scheduled end time of the first video content item; and
- change, based on the predicted end time of the first video content item and prior to the scheduled end time of the first video content item, an indication of a video stream from which a second video content item is scheduled to be recorded, wherein the second video content item is scheduled after the first video content item.

18. The server of claim 17, wherein the instructions, when executed by the one or more processors, cause the server to transmit, based on the predicted end time of the first video content item, an instruction to modify a start time and an end time of a recording of the second video content item.

19. The server of claim 18, wherein the instruction comprises an instruction to modify the start time of the recording to be the predicted end time of the first video content item.

20. The server of claim 17, wherein the instructions, when executed by the one or more processors, cause the server to extract, from the first video content item, the one or more closed captions.

21. The server of claim 17, wherein the instructions, when executed by the one or more processors, cause the server to:
- retrieve the scheduled end time of the first video content item from metadata corresponding to the first video content item; and
- compare the predicted end time of the first video content item to the scheduled end time of the first video content item.

22. The server of claim 17, wherein the instructions, when executed by the one or more processors, cause the server to:
- modify, based on the predicted end time of the first video content item, a first entry in a content listing; and
- modify, based on the predicted end time of the first video content item, a second entry in the content listing, wherein modifying the second entry in the content listing comprises changing the indication of the video stream from which the second video content item is scheduled to be recorded.

23. The server of claim 17, wherein the instructions, when executed by the one or more processors, cause the server to determine the predicted end time of the first video content item using at least one of computer vision technology or automatic content recognition technology.

24. The server of claim 17, wherein the changed indication of the video stream from which the second video content item is scheduled to be recorded comprises a different channel than a channel providing the first video content item.

* * * * *